(12) United States Patent
Eichenberger et al.

(10) Patent No.: US 8,904,153 B2
(45) Date of Patent: Dec. 2, 2014

(54) VECTOR LOADS WITH MULTIPLE VECTOR ELEMENTS FROM A SAME CACHE LINE IN A SCATTERED LOAD OPERATION

(75) Inventors: Alexandre E. Eichenberger, Chappaqua, NY (US); Michael K. Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 12/876,321

(22) Filed: Sep. 7, 2010

(65) Prior Publication Data

US 2012/0060015 A1    Mar. 8, 2012

(51) Int. Cl.
  *G06F 9/345* (2006.01)
  *G06F 9/30* (2006.01)
  *G06F 9/38* (2006.01)
  *G06F 15/80* (2006.01)

(52) U.S. Cl.
  CPC ........ *G06F 9/30018* (2013.01); *G06F 15/8069* (2013.01); *G06F 9/30032* (2013.01); *G06F 9/30036* (2013.01); *G06F 9/30043* (2013.01); *G06F 9/3857* (2013.01)
  USPC ................................ 712/225; 711/118; 712/4

(58) Field of Classification Search
  CPC ............ G06F 9/30036; G06F 15/8061; G06F 15/8069
  USPC ..................................................... 712/4, 225
  See application file for complete search history.

(56) References Cited

U.S. PATENT DOCUMENTS

| | | | |
|---|---|---|---|
| 4,881,168 A | 11/1989 | Inagami et al. | |
| 4,888,679 A | 12/1989 | Fossum et al. | |
| 5,640,524 A * | 6/1997 | Beard et al. | 712/222 |
| 5,884,089 A | 3/1999 | Orian et al. | |
| 5,895,501 A * | 4/1999 | Smith | 711/207 |
| 6,662,280 B1 * | 12/2003 | Hughes | 711/156 |
| 7,200,724 B2 | 4/2007 | Barlow et al. | |
| 7,437,521 B1 * | 10/2008 | Scott et al. | 711/151 |
| 7,627,735 B2 | 12/2009 | Espasa et al. | |
| 7,660,967 B2 | 2/2010 | Hutson | |
| 8,495,301 B1 * | 7/2013 | Alexander et al. | 711/118 |
| 2002/0032841 A1 * | 3/2002 | Yamashiroya | 711/133 |
| 2007/0277003 A1 | 11/2007 | Caulk | |

(Continued)

OTHER PUBLICATIONS

U.S. Appl. No. 12/876,432.

(Continued)

*Primary Examiner* — Andrew Caldwell
*Assistant Examiner* — Keith Nielsen
(74) *Attorney, Agent, or Firm* — Stephen J. Walder, Jr.; William J. Stock

(57) ABSTRACT

Mechanisms for performing a scattered load operation are provided. With these mechanisms, an extended address is received in a cache memory of a processor. The extended address has a plurality of data element address portions that specify a plurality of data elements to be accessed using the single extended address. Each of the plurality of data element address portions is provided to corresponding data element selector logic units of the cache memory. Each data element selector logic unit in the cache memory selects a corresponding data element from a cache line buffer based on a corresponding data element address portion provided to the data element selector logic unit. Each data element selector logic unit outputs the corresponding data element for use by the processor.

24 Claims, 7 Drawing Sheets

| ADD. TAG 610 | CACHE LINE ADDRESS PORTION 620 | DATA ELEMENT 0 ADDRESS BITS 630 | DATA ELEMENT 1 ADDRESS BITS 640 | DATA ELEMENT 2 ADDRESS BITS 650 | DATA ELEMENT 3 ADDRESS BITS 660 |
|---|---|---|---|---|---|

(56) References Cited

U.S. PATENT DOCUMENTS

| | | |
|---|---|---|
| 2007/0283127 A1* | 12/2007 | Kohn .......................... 711/218 |
| 2009/0113159 A1 | 4/2009 | Mekhiel |
| 2009/0172348 A1 | 7/2009 | Cavin |
| 2009/0228657 A1* | 9/2009 | Hagiwara ..................... 711/129 |
| 2009/0249026 A1 | 10/2009 | Smelyanskiy et al. |
| 2010/0095086 A1* | 4/2010 | Eichenberger et al. ........... 712/2 |

OTHER PUBLICATIONS

Absar, Javed et al., "Locality Optimization in Wireless Applications", ACM, CODES+ISSS'07, Sep. 30-Oct. 3, 2007, pp. 125-130.

Chouliaras, V.A. et al., "Real-time VLSI architecture for bio-medical monitoring", IEEE, Proceedings of the 5th International Conference on Information Technology and Application in Biomedicine, in conjunction with The 2nd International Symposium & Summer School on Biomedical and Health Engineering, May 30-31, 2008, pp. 463-466.

Cray, Seymour R. et al., "Vector Tailgating in Computers with Vector Registers", CSA Technology Research Database, DIALOG/CSA, http://patents.ic.gc.ca/cipo/cpd/en/patent/1321027/summary.html, 2009, Abstract, 1 page.

Eichenberger, Alexandre E. et al., "Vectorization for SIMD Architectures with Alignment Constraints", ACM, PLDI'04 Jun. 9-11, 2004, 12 pages.

Furtak, Timothy et al., "Using SIMD Registers and Instructions to Enable Instruction-Level Parallelism in Sorting Algorithms", ACM, SPAA'07, Jun. 9-11, 2007, pp. 348-357.

He, Yun et al., "MPI and OpenMP Paradigms on Cluster of SMP Architectures: the Vacancy Tracking Algorithm for Multi-Dimensional Array Transposition", IEEE, 2002, pp. 1-14.

Mathew, Binu K. et al., "Algorithmic Foundations for a Parallel Vector Access Memory System", ACM,SPAA, 2000, pp. 156-165.

Tarjan, David et al., "Increasing Memory Miss Tolerance for SIMD Cores", ACM, SC09, Nov. 14-20, 2009, 11 pages.

Zhang, Lixin et al., "Efficient Address Remapping in Distributed Shared-Memory Systems", ACM Transactions on Architecture and Code Optimization, vol. 3, No. 2, Jun. 2006, pp. 209-229.

Office Action mailed Jul. 26, 2013 for U.S. Appl. No. 12/876,432; 13 pages.

Final Office Action mailed Dec. 24, 2013 for U.S. Appl. No. 12/876,432; 15 pages.

Response to Office Action filed with the USPTO on Oct. 28, 2013 for U.S. Appl. No. 12/876,432, 17 pages.

* cited by examiner

VECTOR LOADS WITH MULTIPLE VECTOR ELEMENTS FROM A SAME CACHE LINE IN A SCATTERED LOAD OPERATION

BACKGROUND

The present application relates generally to an improved data processing apparatus and method and more specifically to mechanisms for performing vector loads with multiple vector elements from a same cache line in a scattered load operation.

Multimedia extensions (MMEs) have become one of the most popular additions to general-purpose microprocessors. Existing multimedia extensions can be characterized as Single Instruction Multiple Data (SIMD) path units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative is to exploit vectorization technology to automatically generate SIMD codes from programs written in standard high-level languages.

Although vectorization has been studied extensively for traditional vector processors decades ago, vectorization for SIMD architectures has raised new issues due to several fundamental differences between the two architectures. To distinguish between the two types of vectorization, the latter is referred to as SIMD vectorization, or SIMDization. One such fundamental difference comes from the memory unit. The memory unit of a typical SIMD processor bears more resemblance to that of a wide scalar processor than to that of a traditional vector processor. In the VMX instruction set found on certain PowerPC microprocessors (produced by International Business Machines Corporation of Armonk, N.Y.), for example, a load instruction loads 16-byte contiguous memory from 16-byte aligned memory, ignoring the last 4 bits of the memory address in the instruction. The same applies to store instructions.

There has been a recent spike of interest in compiler techniques to automatically extract SIMD parallelism from programs. This upsurge has been driven by the increasing prevalence of SIMD architectures in multimedia processors and high-performance computing. These processors have multiple function units, e.g., floating point units, fixed point units, integer units, etc., which can execute more than one instruction in the same machine cycle to enhance the uni-processor performance. The function units in these processors are typically pipelined.

Often times, it is desirable, in the execution of a program using SIMD parallelism, to load data from a number of different locations of memory, e.g., a number of different cache lines in a cache memory or a number of non-contiguous locations within the same cache line. This is referred to as a scattered load. With known SIMD architectures, however, each load of a portion of data must be performed using a separate load instruction and separate permutation instructions for re-aligning the data in the SIMD vector registers. This causes a relatively large overhead for programs that frequently access scattered locations in memory.

SUMMARY

In one illustrative embodiment, a first method, in a logic unit of a processor, for performing a scattered load operation. The method comprises receiving, in the logic unit of the processor, a gather instruction specifying a plurality of addresses in a memory from which data is to be loaded into a target vector register of the processor. The method also comprises automatically generating, within the logic unit of the processor, a plurality of separate load instructions for loading the data from the plurality of addresses in the memory based on the gather instruction. Moreover, the method comprises sending, from the logic unit within the processor, the plurality of separate load instructions to one or more load/store units of the processor. Furthermore, the method comprises gathering, within the logic unit of the processor, the data corresponding to the plurality of addresses in a buffer of the processor. In addition, the method comprises writing, by the logic unit of the processor, data stored in the buffer to the target vector register.

In other illustrative embodiments, a system/apparatus and processor are provided. The system/apparatus may comprise one or more processors and a memory coupled to the one or more processors. The system/apparatus may comprise a logic unit that operates to perform a scattered load operation such as in the manner outlined above with regard to the first method. The processor may comprise a gather unit or other special load generating unit, one or more load/store units coupled to the gather unit (or other load generating unit), a gather buffer coupled to the gather unit (or other load generating unit), and a target vector register coupled to the gather unit (or other load generating unit). The gather unit may comprise logic that implements the method outlined above.

In still other illustrative embodiments, a second method, in a processor, is provided for performing a scattered load operation. The method comprises receiving, in a cache memory of the processor, an extended address having a plurality of data element address portions that specifies a plurality of data elements to be accessed using the single extended address. The method further comprises providing each of the plurality of data element address portions to corresponding data element selector logic units of the cache memory. Moreover, the method comprises selecting, by each data element selector logic unit in the cache memory, a corresponding data element from a cache line buffer based on a corresponding data element address portion provided to the data element selector logic unit. In addition, the method comprises outputting, by each data element selector logic unit, the corresponding data element.

In other illustrative embodiments, a system/apparatus and processor are provided. The system/apparatus may comprise a cache memory array, a cache line buffer coupled to the cache memory array, and a plurality of data element selector logic units coupled to the cache line buffer. The system/apparatus may comprise logic that operates to perform a scattered load operation such as in the manner outlined above with regard to the second method or a combination of the first and second methods. The processor may comprise a cache memory unit comprising a plurality of data element selector logic units and a cache line buffer, and a load/store unit coupled to the cache memory unit. These elements, and/or other logic within the processor, may operate to perform the second method described above or a combination of the first and second methods described above. These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 9 is a block diagram of an example data processing system in which aspects of the illustrative embodiments may be implemented.

DETAILED DESCRIPTION

Figure 1:
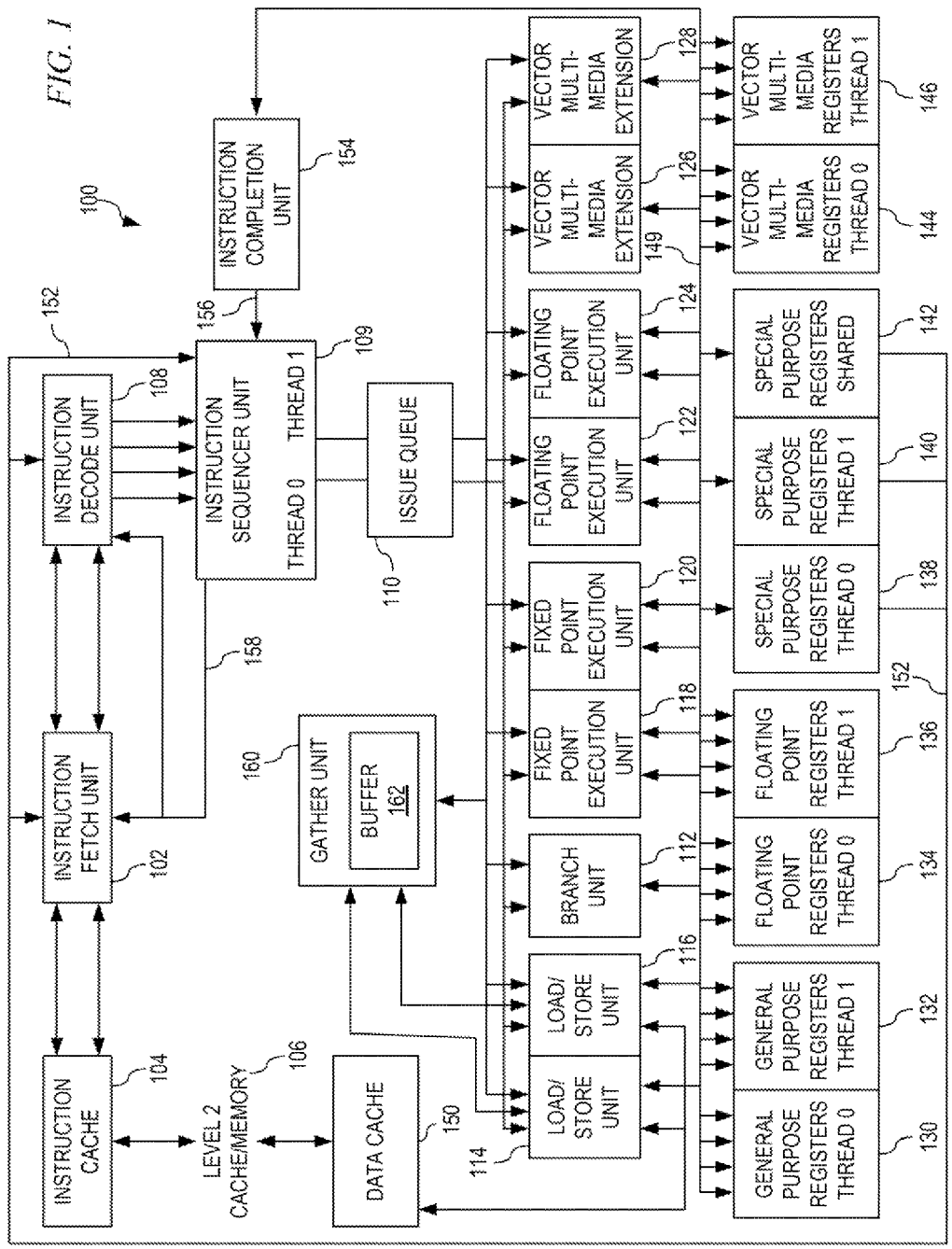
FIG. 1 is an exemplary block diagram of a dual threaded processor architecture in accordance with one illustrative embodiment.

The illustrative embodiments provide a mechanism for performing vector loads from scattered memory locations. The mechanisms of the illustrative embodiments provide support for loading scattered data from different addresses in memory into a single vector register with a minimum amount of permutation as possible. The mechanisms of the illustrative embodiments introduce a new gather unit, or special load generating unit, that controls the load instructions of the scattered load operation. Data from different cache lines, or non-contiguous locations of a same cache line, of a cache memory are assembled and permuted in this gather unit. Once the whole vector is assembled, the results of the scattered load may the transferred into a destination vector register for use in performing computations. When a scattered load is completed, it can be removed from the load/store queue where consistency is maintained.

The mechanisms of the illustrative embodiments are preferably implemented in conjunction with a compiler that transforms source code into code for execution on one or more processors capable of performing vectorized instructions, e.g., single instruction, multiple data (SIMD) instructions. With the mechanisms of the illustrative embodiments, in transforming the source code, e.g., scalar code, into SIMD vectorized code, vector gather (vgather) instructions may be inserted into the code at appropriate locations to take advantage of the use of the functionality of the new gather unit implemented by the present invention. The compiler determines the appropriate insertion point according to one or more methodologies. For example, the compiler may analyze the source code to determine if multiple loads are being performed in close proximity to each other within the code, e.g., within a predetermined number of instructions of each other. In such a case, the loads may be replaced with a single vgather instruction to perform a scattered load to obtain all of the data for each separate load.

The vgather instruction implements a scattered data load from a memory, such as a cache or the like. The vgather instruction specifies a base address register (rb), an offset address vector register (vra) that specifies address offsets for the plurality of data to be loaded as part of the scattered load, and a destination vector register for the result of the scattered load. From this, the gather unit of the illustrative embodiments may break down the vgather instruction into separate load instructions for each of the specified offsets, issue the load instructions to the load/store unit, and buffer and permute the returned data. Once all the data is returned and proper permutations are performed within the gather unit, the resulting vector is saved into the specified destination register vii for use in subsequent computations.

Moreover, the illustrative embodiments provide mechanisms for performing vector loads with multiple vector elements being obtained from non-contiguous locations within a same cache line without having to send separate load instructions for each of the vector elements being obtained from the same cache line. With this additional mechanism, the cache itself is augmented to include additional selection logic for selecting multiple portions of the cache line for output by the cache into a vector register in response to the input of a single address specifying the multiple portions of the cache line to be output. This mechanism can be used in conjunction with the gather unit of the illustrative embodiments. For example, rather than the gather unit having to send a separate load instruction to a load/store unit for each portion of data to be read out of the cache, the gather unit may comprise hardware logic for generating a load instruction with an address specifying multiple portions of data to be read from the same cache line and having that data stored in an appropriate slot of a target vector register. In the architectures without a gather unit, a vector load/store unit can have hardware logic for generating a load instruction with address specifying multiple potions of data in the same cache line.

Referring now to FIG. 1, an exemplary block diagram of a dual threaded processor architecture in accordance with one illustrative embodiment. The processor architecture shown in FIG. 1 is an example of a single instruction multiple data (SIMD) architecture in which vector operations and instructions are executed. FIG. 1 is only intended to be an example of an architecture in which the mechanisms of the illustrative embodiments may be implemented and is not intended to state or imply any limitation as to the particular types of architectures that the illustrative embodiments may be embodied in. Thus, the illustrative embodiments may be implemented in any known or later developed SIMD architecture using vectorized instructions, that implements the gather unit according to the illustrative embodiments as described hereafter.

Processor 100 may be implemented as processing unit 906 in FIG. 9, described hereafter, for example, or any other processing unit of any other type of data processing system that may utilize the gather unit and other logic, elements, and functionality introduced into the processor 100 by the mechanisms of the illustrative embodiments. Processor 100 comprises a single integrated circuit superscalar microprocessor with dual-thread simultaneous multi-threading (SMT) that may also be operated in a single threaded mode. Accordingly, as discussed further herein below, processor 100 includes various units, registers, buffers, memories, and other sections, all of which are formed by integrated circuitry. Also, in an illustrative embodiment, processor 100 operates according to reduced instruction set computer (RISC) techniques.

Of particular importance to the illustrative embodiments, the processor 100 includes a gather unit 160 that operates upon gather instructions, as will be described in greater detail hereafter. Moreover, the cache of the processor, e.g., cache 150, is improved by the mechanisms of the illustrative embodiments to include the ability to handle loads/stores of multiple data elements using a single load/store instruction and extended address. Initially, a description of the overall processor architecture shown in FIG. 1 will be provided with a subsequent focus on the addition of the gather unit 160, the way in which the gather unit 160 augments this processor architecture with the ability to perform scattered loads, and the improvement of the cache mechanisms.

As shown in FIG. 1, instruction fetch unit (IFU) 102 connects to instruction cache 104. Instruction cache 104 holds instructions for multiple programs (threads) to be executed. Instruction cache 104 also has an interface to level 2 (L2) cache/memory 106. IFU 102 requests instructions from instruction cache 104 according to an instruction address, and passes instructions to instruction decode unit 108. In an illustrative embodiment, IFU 102 may request multiple instructions from instruction cache 104 for up to two threads at the same time. Instruction decode unit 108 decodes multiple instructions for up to two threads at the same time and passes decoded instructions to instruction sequencer unit (ISU) 109.

Processor 100 may also include issue queue 110, which receives decoded instructions from ISU 109. Instructions are stored in the issue queue 110 while awaiting dispatch to the appropriate execution units. For an out-of order processor to operate in an in-order manner, ISU 109 may selectively issue instructions quickly using false dependencies between each instruction. If the instruction does not produce data, such as in a read after write dependency, ISU 109 may add an additional source operand (also referred to as a consumer) per instruction to point to the previous target instruction (also referred to as a producer). Issue queue 110, when issuing the producer, may then wakeup the consumer for issue. By introducing false dependencies, a chain of dependent instructions may then be created, whereas the instructions may then be issued only in-order. ISU 109 uses the added consumer for instruction scheduling purposes and the instructions, when executed, do not actually use the data from the added dependency. Once ISU 109 selectively adds any required false dependencies, then issue queue 110 takes over and issues the instructions in order for each thread, and outputs or issues instructions for each thread to execution units 112, 114, 116, 118, 120, 122, 124, 126, and 128 of the processor. This process will be described in more detail in the following description.

In an illustrative embodiment, the execution units of the processor may include branch unit 112, load/store units (LSUA) 114 and (LSUB) 116, fixed point execution units (FXUA) 118 and (FXUB) 120, floating point execution units (FPUA) 122 and (FPUB) 124, and vector multimedia extension units (VMXA) 126 and (VMXB) 128. Execution units 112, 114, 116, 118, 120, 122, 124, 126, and 128 are fully shared across both threads, meaning that execution units 112, 114, 116, 118, 120, 122, 124, 126, and 128 may receive instructions from either or both threads. The processor includes multiple register sets 130, 132, 134, 136, 138, 140, 142, 144, and 146, which may also be referred to as architected register files (ARFs).

An ARF is a file where completed data is stored once an instruction has completed execution. ARFs 130, 132, 134, 136, 138, 140, 142, 144, and 146 may store data separately for each of the two threads and by the type of instruction, namely general purpose registers (GPRs) 130 and 132, floating point registers (FPRs) 134 and 136, special purpose registers (SPRs) 138 and 140, and vector registers (VRs) 144 and 146. Separately storing completed data by type and by thread assists in reducing processor contention while processing instructions.

The processor additionally includes a set of shared special purpose registers (SPR) 142 for holding program states, such as an instruction pointer, stack pointer, or processor status word, which may be used on instructions from either or both threads. Execution units 112, 114, 116, 118, 120, 122, 124, 126, and 128 are connected to ARFs 130, 132, 134, 136, 138, 140, 142, 144, and 146 through simplified internal bus structure 149.

In order to execute a floating point instruction, FPUA 122 and FPUB 124 retrieves register source operand information, which is input data required to execute an instruction, from FPRs 134 and 136, if the instruction data required to execute the instruction is complete or if the data has passed the point of flushing in the pipeline. Complete data is data that has been generated by an execution unit once an instruction has completed execution and is stored in an ARF, such as ARFs 130, 132, 134, 136, 138, 140, 142, 144, and 146. Incomplete data is data that has been generated during instruction execution where the instruction has not completed execution. FPUA 122 and FPUB 124 input their data according to which thread each executing instruction belongs to. For example, FPUA 122 inputs completed data to FPR 134 and FPUB 124 inputs completed data to FPR 136, because FPUA 122, FPUB 124, and FPRs 134 and 136 are thread specific.

During execution of an instruction, FPUA 122 and FPUB 124 output their destination register operand data, or instruction data generated during execution of the instruction, to FPRs 134 and 136 when the instruction has passed the point of flushing in the pipeline. During execution of an instruction, FXUA 118, FXUB 120, LSUA 114, and LSUB 116 output their destination register operand data, or instruction data generated during execution of the instruction, to GPRs 130 and 132 when the instruction has passed the point of flushing in the pipeline. During execution of a subset of instructions, FXUA 118, FXUB 120, and branch unit 112 output their destination register operand data to SPRs 138, 140, and 142 when the instruction has passed the point of flushing in the pipeline. Program states, such as an instruction pointer, stack pointer, or processor status word, stored in SPRs 138 and 140 indicate thread priority 152 to ISU 109. During execution of an instruction, VMXA 126 and VMXB 128 output their destination register operand data to VRs 144 and 146 when the instruction has passed the point of flushing in the pipeline.

Data cache 150 may also have associated with it a non-cacheable unit (not shown) which accepts data from the processor and writes it directly to level 2 cache/memory 106. In this way, the non-cacheable unit bypasses the coherency protocols required for storage to cache.

In response to the instructions input from instruction cache 104 and decoded by instruction decode unit 108, ISU 109 selectively dispatches the instructions to issue queue 110 and then onto execution units 112, 114, 116, 118, 120, 122, 124, 126, and 128 with regard to instruction type and thread. In turn, execution units 112, 114, 116, 118, 120, 122, 124, 126, and 128 execute one or more instructions of a particular class or type of instructions. For example, FXUA 118 and FXUB 120 execute fixed point mathematical operations on register source operands, such as addition, subtraction, ANDing, ORing and XORing. FPUA 122 and FPUB 124 execute floating point mathematical operations on register source operands, such as floating point multiplication and division. LSUA 114 and LSUB 116 execute load and store instructions, which move operand data between data cache 150 and ARFs 130, 132, 134, and 136. VMXA 126 and VMXB 128 execute single instruction operations that include multiple data. Branch unit 112 executes branch instructions which conditionally alter the flow of execution through a program by modifying the instruction address used by IFU 102 to request instructions from instruction cache 104.

Instruction completion unit 154 monitors internal bus structure 149 to determine when instructions executing in execution units 112, 114, 116, 118, 120, 122, 124, 126, and 128 are finished writing their operand results to ARFs 130, 132, 134, 136, 138, 140, 142, 144, and 146. Instructions executed by branch unit 112, FXUA 118, FXUB 120, LSUA 114, and LSUB 116 require the same number of cycles to execute, while instructions executed by FPUA 122, FPUB 124, VMXA 126, and VMXB 128 require a variable, and a larger number of cycles to execute. Therefore, instructions that are grouped together and start executing at the same time do not necessarily finish executing at the same time. "Completion" of an instruction means that the instruction is finishing executing in one of execution units 112, 114, 116, 118, 120, 122, 124, 126, or 128, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 154 monitors for the completion of instructions, and sends control information 156 to ISU 109 to notify ISU 109 that more groups of instructions can be dispatched to execution units 112, 114, 116, 118, 120, 122, 124, 126, and 128. ISU 109 sends dispatch signal 158, which serves as a throttle to bring more instructions down the pipeline to the dispatch unit, to IFU 102 and instruction decode unit 108 to indicate that it is ready to receive more decoded instructions. While processor 100 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

It should be noted that contrary to known processor architectures, the processor 100 includes an additional hardware unit referred to herein as the gather unit 160. The gather unit 160 provides hardware logic for implementing a vector gather (vgather) instruction in the instruction set architecture of the processor. This vgather instruction can be used to replace a sequence of separate load instructions and permute instructions with a single vgather instruction that reduces the utilization of the other hardware resources and frees them for use by other instructions executing either sequentially or in parallel with the vgather instruction.

Figure 2:
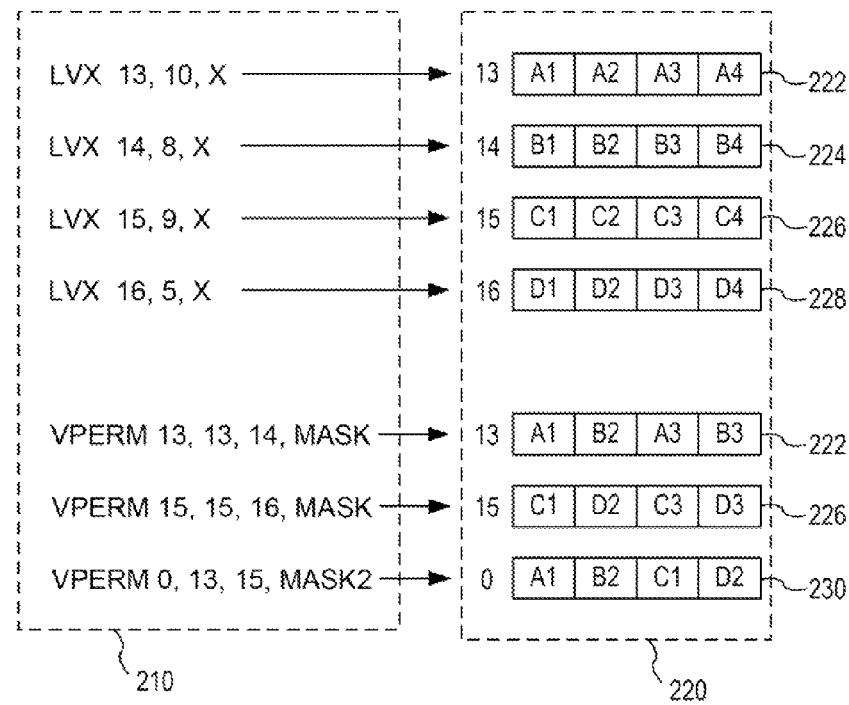
FIG. 2 is an example of code and corresponding register states for performing scattered load operation in accordance with a known architecture.

For example, as shown in FIG. 2, a series of load and permute instructions 210 are shown along-side the corresponding vector register values 220. In the depicted example, it is assumed that the processor architecture supports vector registers having four slots with each slot representing a different instruction or portion of data. As shown in FIG. 2, a first vector load instruction lvx 13, 10, x is used to load a first vector register 222 with the values A1, A2, A3, and A4. A second vector load instruction lvx 14, 8, x is used to load a second vector register 224 with the values B1, B2, B3, and B4. A third vector load instruction lvx 15, 9, x is used to load a third vector register 226 with the values C1, C2, C3, and C4. A fourth vector load instruction lvx 16, 5, x is used to load a fourth vector register 228 with the values D1, D2, D3, and D4.

Thereafter, a series of permutation operations are performed on the loaded vector registers 222-228 so as to generate a single result vector in result vector register 230 that corresponds to the vector that was intended to be loaded. For example, a first vector permute instruction vperm 13, 13, 14, mask is executed and uses a mask to combine the values from vector registers 222 and 224 such that a result of A1, B2, A3, B3 is obtained in vector register 222. A second vector permute instruction vperm 15, 15, 16, mask is executed and uses a mask to combine the values from vector registers 226 and 228 to obtain the result of C1, D2, C3, D3 in vector register 224. Thereafter, a third vector permute instruction vperm 0, 13, 15, mask2 is executed and uses a different mask, i.e. mask 2, to generate a result from combining the values from the already permuted vector registers 222 and 226, i.e. A1, B2, C1, and D2 in result vector register 230. It should be appreciated that this description above assumes that the alignment of the values in the vector registers is known. If the alignment is not known, then four additional permute instructions may be needed to first shift the desired data to slot 0 of the vector registers before performing the above vector permute operations.

Thus, the above architecture requires at least 4 load instructions and a plurality of permute instructions in order to obtain a desired vector in a result vector register. The mechanisms of the illustrative embodiments replaces all of these instructions with a single vector gather instruction that is handled by the gather unit 160. As a result, the processor hardware, e.g., instruction fetch unit 102, instruction decode unit 152, instruction sequencer unit 109, issue queue 110, etc., does not need to process as many instructions to obtain the same result vector in a result vector register. Rather, the separate loads and permutations are handled within the hardware logic of the gather unit 160 without having to issue additional instructions through the processor pipeline.

As mentioned above, the gather unit 160 operates on vector gather instructions to perform a scattered load operation and output a resulting vector that stores in the slots of the result vector, the data that was gathered from scattered memory locations, e.g., data from scattered cache line locations in data cache 150. That is, vgather instructions are dispatched by the issue queue 110 to the gather unit 160 after instruction decoding by the instruction decode unit 108 and sequencing by the instruction sequencer unit 109. The hardware logic within the gather unit 160 receives the vgather instruction and generates a separate load instruction for each of the separate portions of data, i.e. separate memory or cache line addresses, that are to be loaded. These separate load instructions are issued directly from the gather unit 160 to a load/store unit 114 and/or 116. These separate loads are issued simultaneously as much as possible, i.e. as many of the separate loads as the architecture permits are issued simultaneously to the load/store units 114 and/or 116. Data that is returned by the execution of these load instructions is returned by the load/store units 114 and/or 116 to the gather unit 160.

The gather unit 160 contains a buffer 162 for buffering partial results of these separate loads. Thus, results of the separate loads are buffered in buffer 162 until the gather unit 160 determines that all of the separate loads have returned the requested data for the vgather instruction. It should be noted that once load data is returned by the load/store units 114 and 116 for the separate loads, the load/store units 114 and 116 may remove the separate load instruction from its queue. This is important in that the load/store unit queues are a critical, or limited and highly used, resource in the processor architecture and are freed by the mechanisms of the illustrative embodiments so that they may be used by subsequent instructions that may be executing sequentially or in parallel. In prior architectures where separate loads must be issued by the issue queue 110 to perform the separate load instructions, the load is not removed from the load/store unit's queue until a completion of the instruction is signaled through the instruction completion unit 154. Thus, the mechanisms of the illustrative embodiments free load/store unit queue resources earlier than known architectures.

Figure 3:
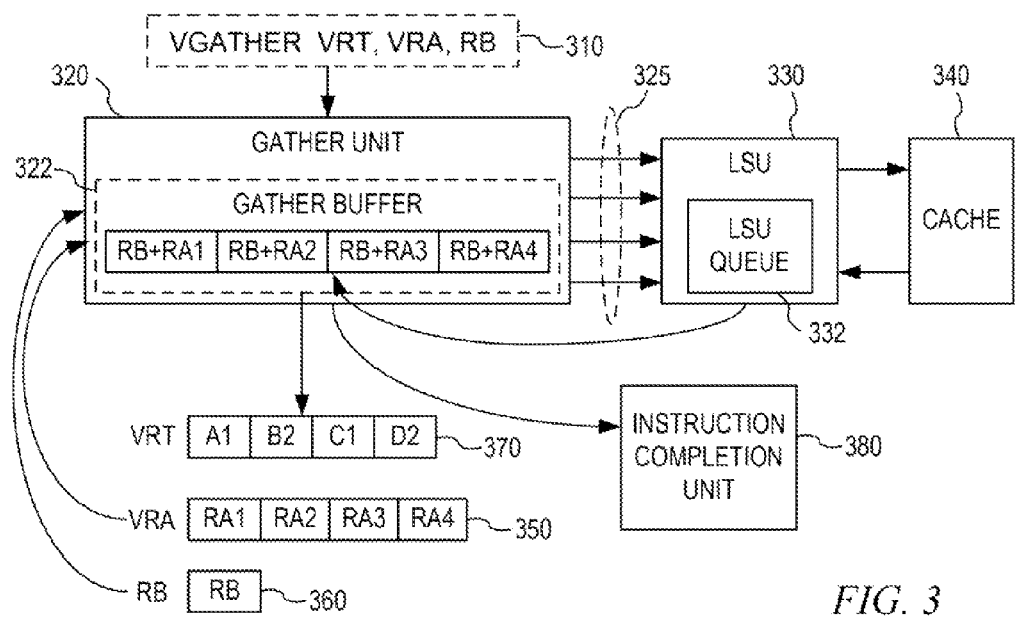
FIG. 3 is an example diagram illustrating the processing of a gather instruction using a gather unit in accordance with one illustrative embodiment.

FIG. 3 is an example diagram illustrating the processing of a vgather instruction in accordance with one illustrative embodiment. It should be appreciated that the vgather instruction is an instruction that is received by the gather unit 320 in response to the vgather instruction being fetched from an instruction cache and issued to the gather unit as part of executing a compiled portion of code. The vgather instruction may be inserted into the code by a compiler as part of an optimization of the code performed by the compiler, for example. That is, original source code may be analyzed by the compiler and a determination may be made that a plurality of loads are being performed in the original code within a predetermined range of each other, e.g., a predetermined number of instructions. The compiler may then choose to replace such separate loads with a single vgather instruction that can be handled by the gather unit 320. As a result, the burden and overhead of having to handle a plurality of loads and perform permute operations on these loads is avoided by use of the vgather instruction and the gather unit 320.

As shown in FIG. 3, a vgather instruction 310 is issued, such as by issue queue 110 in FIG. 1, to the gather unit 320. The vgather instruction implements a scattered data load from a memory, such as a cache 340, or the like. The vgather instruction specifies a base address register (rb) 360, an offset address vector register (vra) 350 that specifies address offsets for the plurality of data to be loaded as part of the scattered load, and a destination vector register (vrt) 370 for the result of the scattered load. The offset addresses in the offset address vector register vra are a result of a previous vector operation. One example from text processing is to use one vector register with vector elements, for example to encode states of different state machines, and to add the vector register to another vector register, which for example represent inputs from four different streams. The result vector elements are address offsets for the next state. Any other approach for generating address offsets can be used without departing from spirit and scope of the illustrative embodiments.

The offset address vector register vra 350 stores a vector of address offsets ra1, ra2, ra3, and ra4, for the data that is to be loaded using the vgather instruction and thus, may comprise a plurality of offset addresses upon which separate load instructions may be generated. That is, the combination of the base address stored in the base address register rb 360 and an offset address specified in a slot of the offset address vector register 350, i.e. rb+ra, indicates the particular data element to be retrieved from a memory, such as cache 340. In one example embodiment, the processor architecture supports vector registers having four slots and thus, the offset address vector register vra 350 may specify up to four separate pieces of data, by specifying four separate address offsets, ra1, ra2, ra3, and ra4, that are to be loaded by the vgather instruction.

The gather unit 320 receives the vgather instruction and generates, via its hardware logic, separate load instructions 325, one for each slot in the offset address vector of the offset address vector register 350. Thus, in the depicted example, four separate load instructions 325 are generated by the gather unit 320 and transmitted to one or more load/store units 330.

As many of the load instructions 325 as can be handled by the processor architecture simultaneously, are sent simultaneously in a parallel fashion to the one or more load/store units 330. Thus, for example, in the processor architecture shown in FIG. 1 above, each load/store unit may process two threads and thus, all four load instructions 325 may be sent at substantially a same time, i.e. substantially simultaneously, with each load/store unit 114, 116 in FIG. 1 handling two of the load instructions 325 and returning results data to the gather unit 320.

The separate load instructions 325 are stored in the load/store unit's queue 332 for processing. The load/store unit 330 retrieves the data from the cache 440 and provides the data to the gather unit 320. Once a load instruction generated by the gather unit 320 has been processed by the load/store unit 330 and the results data returned, rather than having to wait to go through the formal completion process of the processor pipeline using the instruction completion unit 154 in FIG. 1, the load instruction may be immediately removed from the load/store unit's queue 332 thereby freeing up space in the queue 332 for additional load/store instructions. Because the processor architecture is a SIMD architecture, and the gather instruction implies that the data being gathered is scattered, it can be assumed that the data is independent of each other and so there is no need for consistency checking via the instruction completion unit 154.

Loads issued by the gather unit are different compared to regular loads—either by having attached a tag, or by using different encoding, or some other means. Thus, the load/store unit can handle loads from the gather unit differently than regular loads. For one, the data returned from the cache or other memories are forwarded to the gather unit, and not to the vector registers. In addition, loads from the gather unit are not checked for consistency.

In one illustrative embodiment, each gather load has a tag with several sub-fields which fully describes a vgather instruction: the first sub-field specifies which vgather instruction for tracking it internally within the gather unit (i.e., vgather 1D), the next sub-field specifies which element of the result vector vrt it contains (in the example with four elements packed in a vector register, this sub-field of the tag specifies the i-th element, i being 0 to 3, of the vrt register); the last sub-field of the tag specifies the offset of the element from the returned data—i.e., it specifies which j-th element from the returned data should be used to load in the i-the element of vrt register.

The results data returned by the load/store unit 330 in response to the separate load instructions 325 is stored in the gather buffer 322. The results data is stored in a proper slot of the gather buffer 322 corresponding to the slot of the offset address in the offset address vector register 350 from which the corresponding separate load instruction was generated. Thus, the resulting data corresponding to the load from cache 340 of an address corresponding to the base address (rb) plus the first vector slot offset address in the offset address vector register 350, i.e. ra1, is stored in a first vector slot in the gather buffer 322.

Each vector element of the vrt register has a "completeness" bit associated with it. After all of the vector register's data is loaded, this bit is set. Once all of the data for all of the separate loads 325 is returned by the load/store unit 330, the data stored in the gather buffer 322 may be written out to the target, or result, vector register specified in the original vgather instruction, i.e. vrt 370. Alternative to using a "completeness" bit implementation, a counter can be paired to each vrt register in the gather unit. This counter may be incremented each time an element is loaded in vrt register. Once the counter reaches the number of elements in the register, indicating that all elements were loaded, the signal indicates that this vgather instruction is completed, and the vrt register can be written out into the vector register. In addition, the instruction completion unit 380 may be signaled that the vgather instruction has completed.

Thus, with the mechanisms of the illustrative embodiments, rather than having to have code that performs a plurality of related loads and permute operations, a single vgather instruction may be used to perform all of the loads, thereby reducing the burden on the processor pipeline and increasing performance of the processor. The gather unit that processes the vgather instruction provides a capability to automatically generate separate loads from a single vgather instruction. These separate load instructions are handled such that as soon as the data is returned by the load/store unit, the load instruction can be removed from the load/store unit's queue, thereby freeing the load/store unit to perform other loads/stores more quickly than if consistency checks had to be performed via the instruction completion unit. Moreover, the gather unit provides "free" permute functionality in that results from the separate loads are automatically place in a proper corresponding slot of the gather buffer, and subsequently the target or result register. Thus, overhead associated with processing scattered loads is reduced using the gather instruction and gather unit of the illustrative embodiments.

Figure 4:
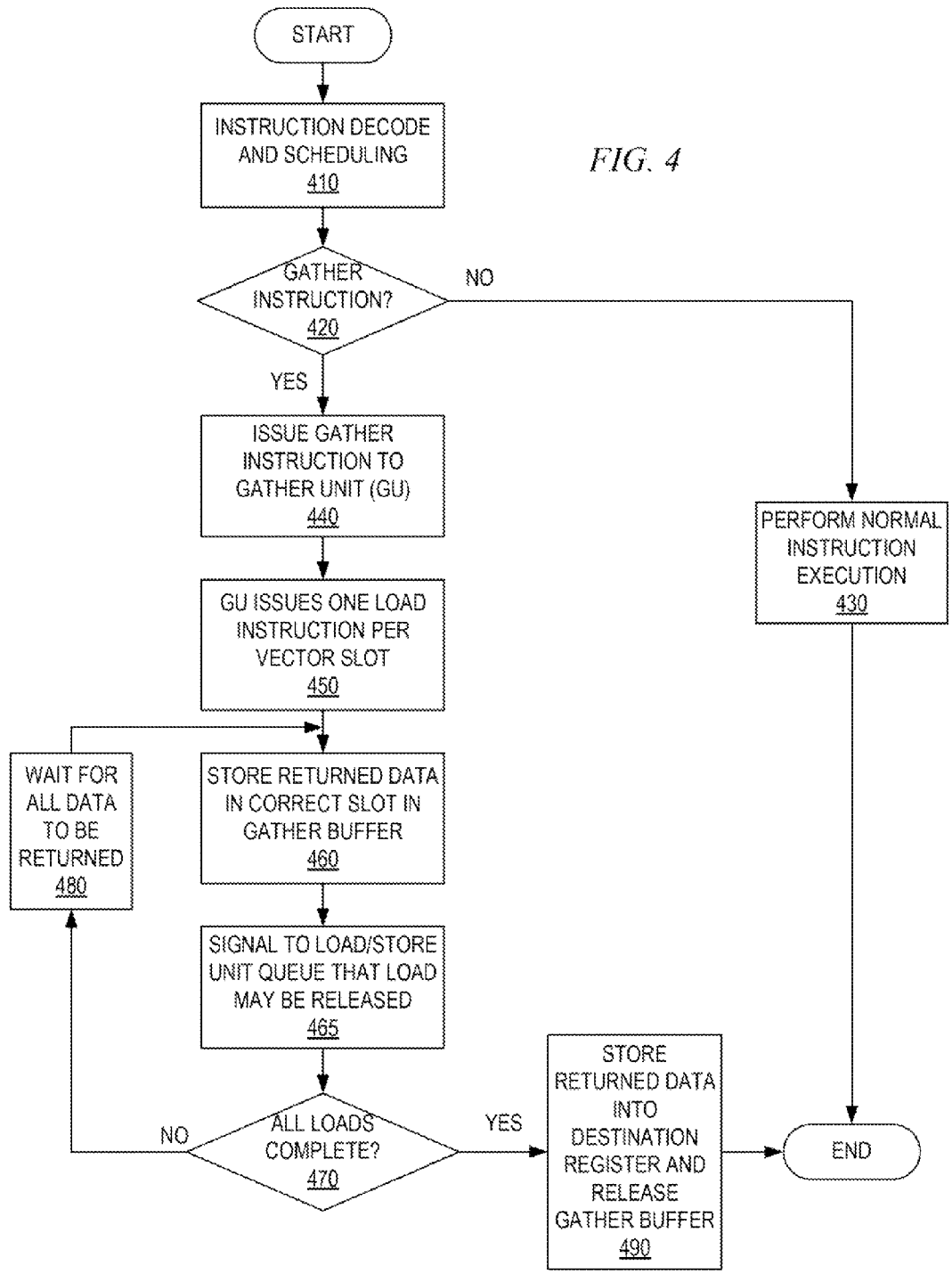
FIG. 4 is a flowchart outlining an example operation for processing a gather instruction using a gather unit in accordance with one illustrative embodiment.

FIG. 4 is a flowchart outlining an example operation for processing a gather instruction using a gather unit in accordance with one illustrative embodiment. As shown in FIG. 4, the operation starts with an instruction being decoded and scheduled (step 410). A determination is made as to whether the instruction is a gather instruction (step 420). If not, then normal execution of the instruction is performed (step 430) and the operation terminates.

If the instruction is a gather instruction (step 420), then the gather instruction is issued to the gather unit (step 440). The gather unit issues one separate load instruction per vector slot in the offset address vector register specified in the gather instruction using the combination of the base address stored in the base address register specified in the gather instruction and the offset address in the particular slot of the offset address vector register (step 450). The data that is returned is stored in a correct or corresponding slot in the gather buffer of the gather unit (step 460). It should also be appreciated that the load/store unit's queue entry for the corresponding load may be released upon completion of the load instruction execution by the load/store unit (step 465).

A determination is made as to whether all of the separate loads have completed (step 470). If not, then the operation waits for all of the data for the separate loads to be returned (step 480) and the operation returns to step 460. If all of the data for the separate loads has been returned, then the data in the gather buffer is written out to the destination or target register and the gather buffer is released (step 490). The operation then terminates.

It should be appreciated that while FIG. 4 shows a termination of this operation, this operation may be repeated with each instruction processed by the processor architecture. Moreover, the gather instruction may be pipelined such that the steps 410-490 shown in FIG. 4 do not need to be completed before processing another gather instruction. Thus, multiple instances of the operations shown in FIG. 4 may be executed at substantially a same time in a pipelined processor, a multiprocessor system, multi-threaded data processing system, or the like. Moreover, many other functions of the processor architecture that are not specific to the understanding of the functionality of the illustrative embodiments have not been shown in FIG. 4 in order to simplify the description to obtain a better understanding of the illustrative embodiments.

The above illustrative embodiments are described in terms of the gather unit generating a separate load instruction for each vector register slot in the offset address vector register. However, there are times when these offset addresses specify portions of data that are to be loaded from a same cache line of a cache memory. While the above mechanisms may handle such situations by issuing separate loads from the gather unit to the load/store units for individually loading the data from the various locations within the same cache line, additional efficiency may be obtained by providing mechanisms in the gather unit and the cache memory for permitting a single load instruction to specify an address identifying a plurality of portions of data at non-contiguous locations within a same cache line to be output by the cache memory to the gather unit. As a result, rather than having to send a plurality of load instructions to the load/store unit, the gather unit may generate a single load instruction for multiple portions of data to be read from the same cache line, thereby reducing the amount of load/store unit resources utilized and increasing the speed by which such data is returned to the gather unit.

Figure 5:
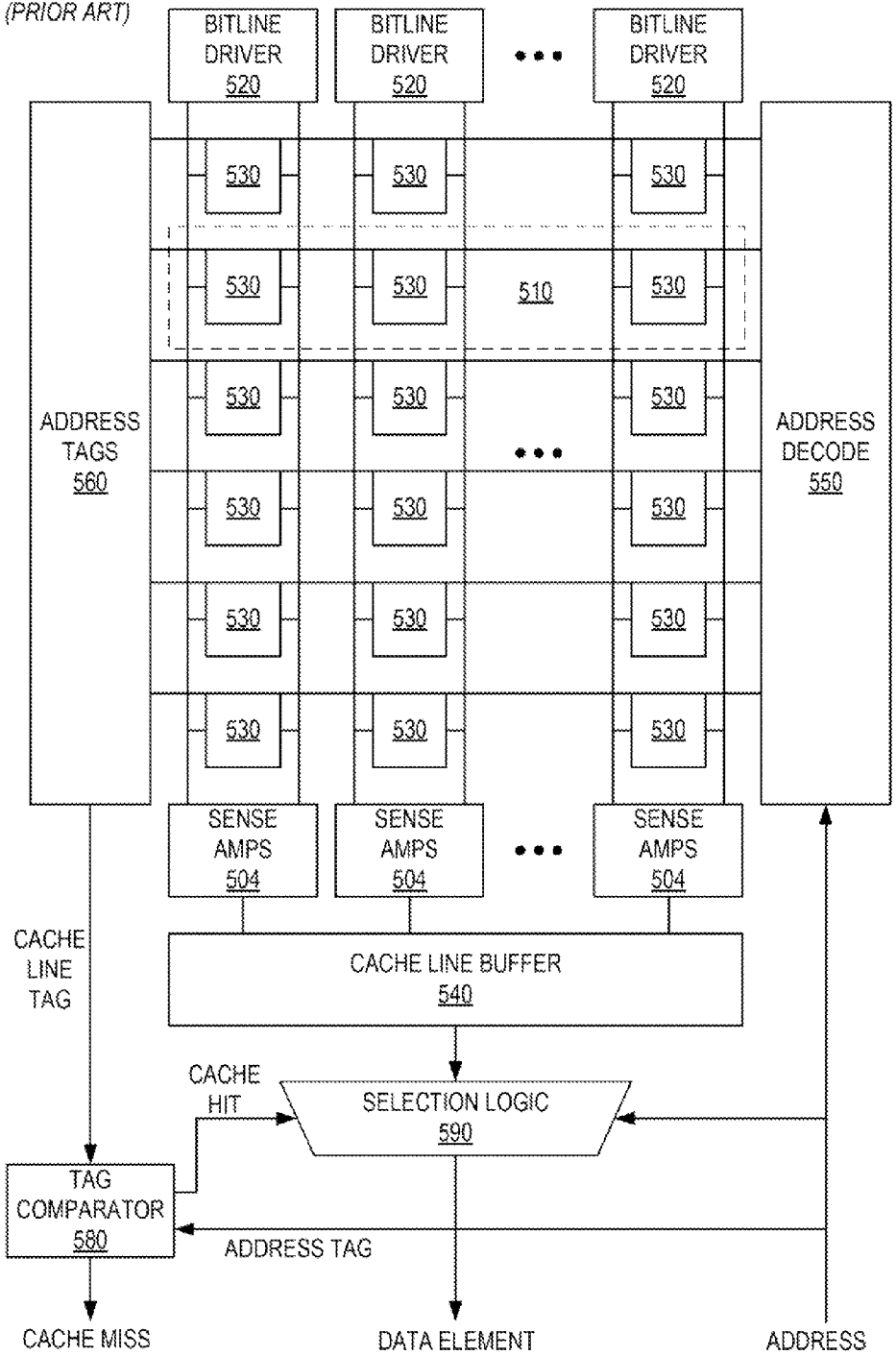
FIG. 5 is an example diagram of a known cache architecture.

FIG. 5 is an example diagram of a known cache architecture. As shown in FIG. 5, the cache 500 comprises a plurality of cache lines 510 comprising a plurality of memory cells 530, a cache line buffer 540, an address decoder 550, an address tag storage 560, a tag buffer 570, a tag comparator 580, and a word/byte selection multiplexer 590. A plurality of bitline drivers 520 and sense amps 504 are provided for outputting a selected cache line to the cache line buffer 540.

The bitline drivers 520 drive the bitlines associated with the memory cells 530 such that when a corresponding cache line 510 is enabled by way of a driver signal from the address decoder 550, data values stored in the corresponding memory cells of the enabled cache line 510 are output to the cache line buffer 540 via the sense amps 504. Bits of an input address may be transmitted to the address decoder 550 along with bits of the address being provided to the word/byte selection multiplexer 590 and the tag comparator 580. The bits of the address provided to the address decoder 550 specifies a cache line 510 in the cache 500 that is to be output to the cache line buffer 540. Bits in the address further specify which portion of the cache line is to be output by the cache to the processor. These bits are input to the word/byte selection multiplexer 590 as a select signal which then causes the corresponding portion of the data in the cache line buffer 540 to be output to the processor upon the occurrence of a cache hit.

The determination of whether there is a cache hit in the cache is performed by the tag comparator 580. The tag comparator compares tag data retrieved from an entry in the address tag storage 560 corresponding to the enabled cache line 510 which is output to the tag buffer 570. The tag corresponding to the enabled cache line 510 is compared, by the tag comparator 580, to the tag specified in the input address to determine if there is a match. If there is a match, then a cache hit is signaled to the word/byte selection multiplexer 590. Otherwise, a cache miss is signaled to cache miss handling logic (not shown).

Thus, with the mechanisms of the known cache architecture, only a single contiguous portion of data may be retrieved from the cache with a single address of a single load instruction. Thus, in order to retrieve multiple portions of data from non-contiguous locations within the cache 500, either in the same or different cache lines 510, a plurality of load instructions specifying separate addresses for the separate portions of data must be generated and sent to the cache to retrieve the corresponding data, such as described above with regard to the gather unit automatically generating and sending separate load instructions based on a received gather instruction.

In a further illustrative embodiment of the present invention, the address for accessing portions of a cache may be extended to include additional bits for specifying more than one portion of data to be retrieved from a cache line in a cache memory. Moreover, additional circuitry may be added to the cache memory structure to permit use of these additional bits for retrieving multiple portions of data from a cache line. Furthermore, the gather unit may be provided with additional hardware logic for identifying when portions of data specified by offset addresses in the offset address vector register specified in a gather instruction are in the same cache line of a cache memory or not and then generate a load instruction specifying an address having the additional bits for identifying multiple portions of data to be read from the cache memory.

Figure 6:
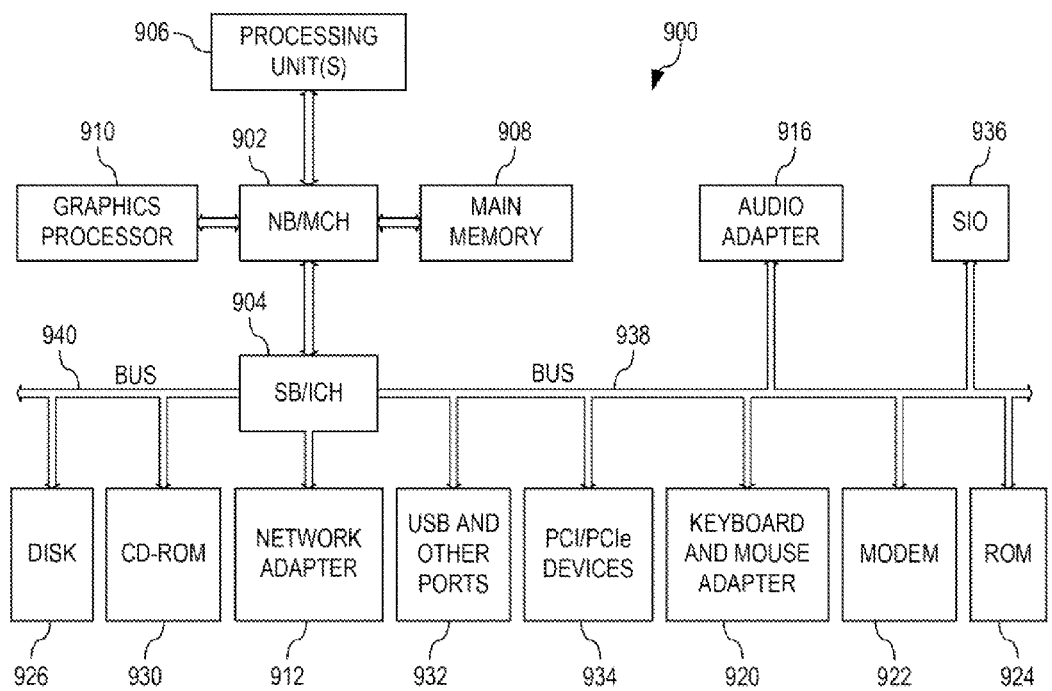
FIG. 6 is an example diagram of an address in accordance with one illustrative embodiment.

FIG. 6 is an example diagram of an address in accordance with one illustrative embodiment. As shown in FIG. 6, the address comprises an tag portion 610 for specifying a cache line tag, a cache line address portion 620 for specifying a cache line within the cache, and data element address bit portions 630-660 for specifying individual addresses of portions of data in a same cache line that are to be accessed using the address 600. A data element is a contiguous portion of data in a cache line. In the depicted example, there are four data element address bit portions 630-660 and thus, up to four separate data elements may be accessed from a same cache line using this one address 600. However, it should be appreciated that the address 600 is only an example. In other illustrative embodiments, different numbers of data elements may be accessed using different numbers of data element address bit portions. For example, rather than having four data element address bit portions 630-660, two, three, five, or more data element address bit portions may be provided in the address 600 for accessing different numbers of data elements from the same cache line.

In one illustrative embodiment, the tag portion 610 and base address portion 620 is common to all of the data elements specified in the data element address bit portions 630-660. Assuming 8 byte data elements and 256 byte cache line, the tag and base address portions 610 and 620 may comprise a first 56 bits, e.g., bits 0 to 55, of the address 600 while each of the data element address bit portions 630-660 may comprise 5 bits for specifying the offset into the cache line corresponding to the particular data element to be accessed. Different sizes of tag and base address portions 610-620 and data element address bit portions 630-660 may be used without departing from the spirit and scope of the illustrative embodiments.

Each of the data element address bit portions 630-660 may be provided to a separate word/byte selection multiplexer in the cache memory for selection of a corresponding data element from the cache line buffer of the cache memory. As a result, a single load instruction specifying a single extended address such as that shown in FIG. 6 may result in a multiple separate data elements being read from the same cache line and provided as output of the cache to the gather unit, for example.

Figure 7:
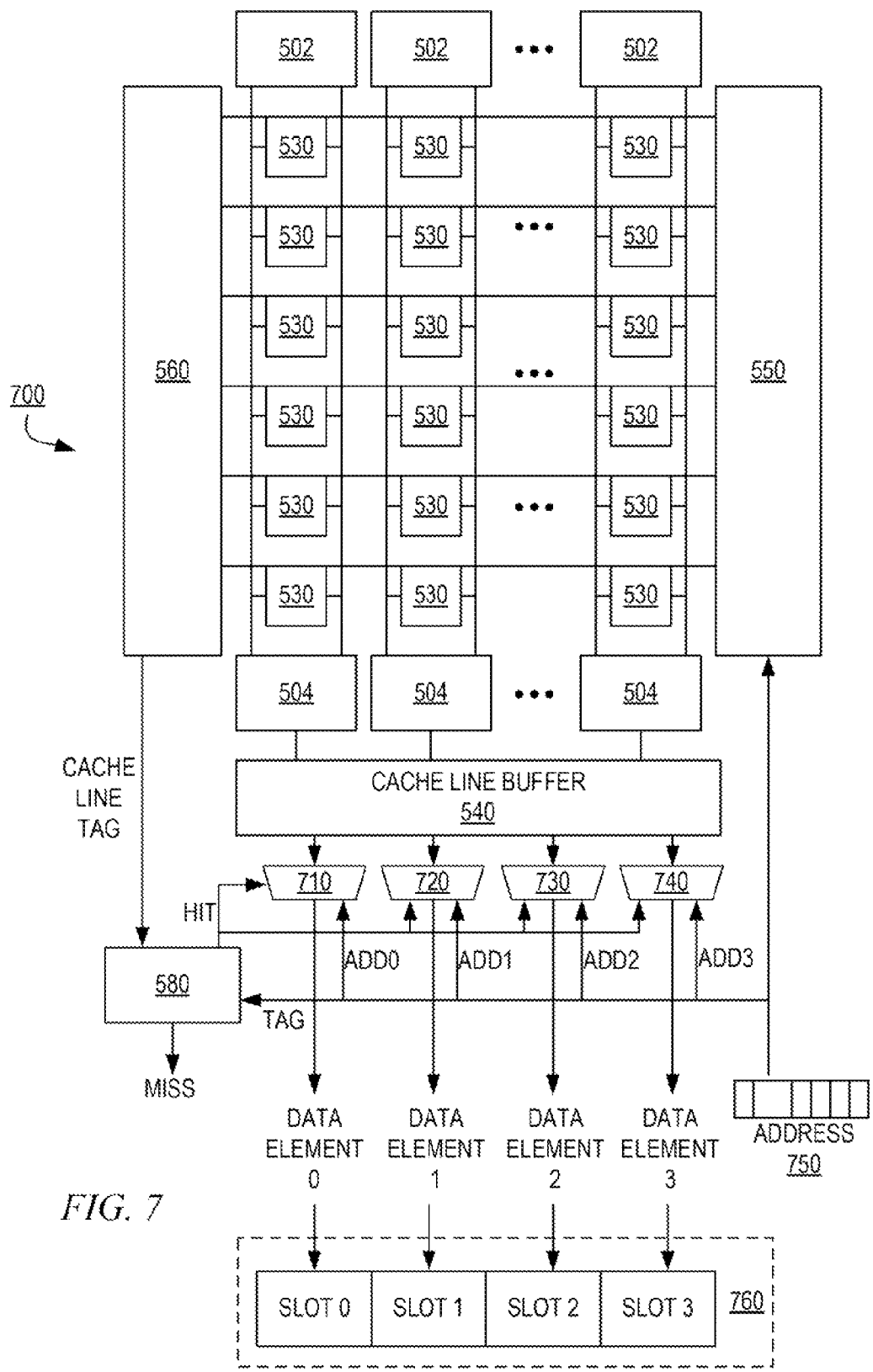
FIG. 7 is an example diagram of a cache memory structure in accordance with one illustrative embodiment.

FIG. 7 is an example diagram of a cache memory structure in accordance with one illustrative embodiment. The cache memory structure 700 in FIG. 7 is similar to the cache structure 600 of FIG. 6 with the exception of the word/by selection multiplexers 710-740 and the additional corresponding signal lines for the additional multiplexers in excess of one multiplexer. That is, the cache memory structure 700 operates in much the same manner as the cache structure 600 with regard to decoding the address using address decoder 650, enabling the corresponding cache line, writing out the enabled cache line to the cache line buffer 640, checking for a cache line hit using the cache line tag and the tag specified in the address, etc. The difference in operation centers around how the plurality of multiplexers 710-740 select portions of data, e.g., words or bytes of data, from the cache line buffer 640 for generating output of the cache 700. In order to achieve this different operation, in addition, the address 750 is extended to include additional bits for specifying additional words/bytes to be selected from the cache line buffer 640.

As shown in FIG. 7, the address 750, which may have a format similar to that of FIG. 6, for example, or at least a portion of the address 750, is input as a selection input to each of the data element selection multiplexers 710-740 in addition to being input to the address decoder 650. With regard to the address decoder 650, the additional bits included in the address 750 for specifying the data elements to be accessed in the cache line may be ignored since the address decoder 650 is looking primarily at the base address to identify the cache line to enable for writing out to the cache line buffer 640. These additional bits for specifying the data elements, however, are used by the data element selection multiplexers 710-740 to select a data element in the cache line buffer 640 for reading out and writing to a target vector register 760. Each data element selection multiplexer 710-740 may retrieve data, from the cache line buffer 640, corresponding to one of the plurality of addresses offsets specified in the extended bits of the address 750, and write the data to a respective slot in the vector register 760.

Thus, taking the address format show in FIG. 6 as an example, a first data element address bit portion 630 (e.g., bits 56-60) is input as a select signal to the first data element selection multiplexer 710, the second data element address bit portion 640 (e.g., bits 61-65) is input as a select signal to the second data element selection multiplexer 720, the third data element address bit portion 650 (e.g., bits 66-70) is input as a select signal to the third data element selection multiplexer 730, and the fourth data element address bit portion 660 (e.g., bits 71-75) is input as a select signal to the fourth data element selection multiplexer 740. In addition, the multiplexers 710-740 receive as an input the result of the comparison from the tag comparator 680. If a cache hit is signaled to the multiplexers 710-740, the multiplexers output the data element corresponding to the respective data element address bit portions 630-660 input to the particular multiplexer 710-740. The multiplexers 710-740 output the respective data elements to corresponding vector slots of the target vector register 750. This target vector register 750 may be returned, such as by the load/store unit, to the processor, the gather unit, or the like.

Thus, for example, the gather unit 420 in FIG. 4 may receive a gather instruction (vgather) and may analyze the offset addresses specified in the offset address vector register specified in the gather instruction. From an addition of the offset address with the base address specified in the base address register identified in the gather instruction, and a knowledge of the size of the cache lines in the cache memory, the gather unit may determine which, if any, of the offset addresses correspond to data elements within a same cache line. Based on a determination that two or more data elements are within a same cache line, rather than sending a separate load instruction to the load/store unit for each data element, as in the previously described illustrative embodiments, the gather unit may issue a single load instruction specifying an extended address for the load that identifies the two or more data elements to be loaded from the same cache line. The load instruction may be processed by the cache memory in the manner described above with regard to FIG. 7 so that a plurality of data elements are output to a target vector register which may then be returned to the gather unit.

It should be appreciated that while the illustrative embodiments described above are described in terms of being used with the gather unit of the processor, the illustrative embodiments are not limited to such. Rather, the extended cache mechanisms and extended address of the illustrative embodiments may be used with any unit in the processor that is capable of requesting access to multiple data elements of a same cache line and receiving multiple data elements in response, such as load/store unit.

Figure 8:
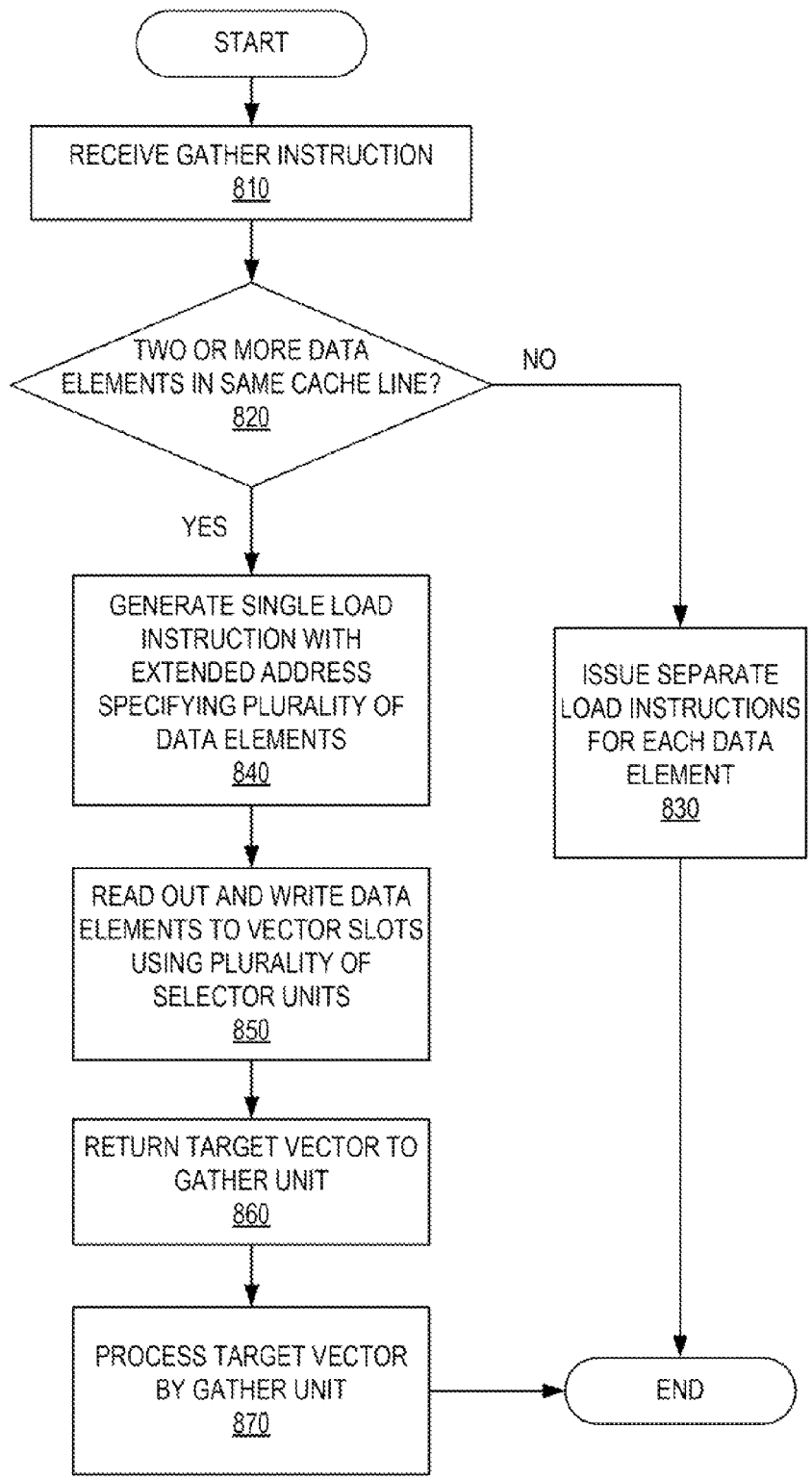
FIG. 8 is a flowchart outlining an example operation for accessing multiple data elements in a same cache line of a cache memory using a single address and single load instruction in accordance with one illustrative embodiment.

FIG. 8 is a flowchart outlining an example operation for accessing multiple data elements in a same cache line of a cache memory using a single address and single load instruction in accordance with one illustrative embodiment. The operation outlined in FIG. 8 is described in terms of the gather unit requesting a load of multiple data elements, however as noted above, the illustrative embodiments are not limited to use with the gather unit and other functional units of a processor may make use of the extended cache mechanisms and extended address of the illustrative embodiments.

As shown in FIG. 8, the operation starts with the gather unit receiving a gather instruction specifying a base address register and an offset address vector register that identifies a plurality of data elements to be loaded (step 810). The gather unit determines if two or more of the data elements specified in the offset address vector register are within a same cache line of the cache memory (step 820). If not, the gather unit sends separate load instructions for each data element specified in the offset address vector register and processes these separate load instructions as previously described above (step 830).

If two or more of the data elements specified in the offset address vector register are within a same cache line, then a single load instruction specifying an extended address for specifying more than one data element is sent for the plurality of data elements to be loaded (step 840). It should be appreciated that separate load instructions for other data elements not within the same cache line may be sent in addition to the single load specifying an extended address. These separate loads are processed in a manner as described previously above.

With regard to the single load instruction specifying the extended address, the data element address portions of the address are input to selection logic of the cache memory which causes the plurality of data elements from the same cache line to be written to corresponding vector slots of a target vector register (step 850). The target vector register is then returned to the gather unit as results of the load instruction (step 860). The gather unit may then process the data elements by placing them in the appropriate vector slots of the target vector register specified in the original load instruction (step 870). The operation then terminates.

Thus, in addition to providing a new gather unit as previously described, further illustrative embodiments provide mechanisms for using a single load instruction specifying an extended address having portions for identifying a plurality of data elements to be accessed from the same cache line. This reduces overhead associated with having to access a plurality of data elements within a same cache line.

It should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

FIG. 9 is a block diagram of an example data processing system in which aspects of the illustrative embodiments, as described above, may be implemented. Data processing system 900 is an example of a computer, e.g., client computer, server computer, or any other type of computing device, in which computer usable code or instructions implementing the processes for illustrative embodiments of the present invention may be located.

In the depicted example, data processing system 900 employs a hub architecture including north bridge and memory controller hub (NB/MCH) 902 and south bridge and input/output (I/O) controller hub (SB/ICH) 904. Processing unit 906, main memory 908, and graphics processor 910 are connected to NB/MCH 902. Graphics processor 910 may be connected to NB/MCH 902 through an accelerated graphics port (AGP). The processing unit 906 may implement the gather unit, enhanced cache mechanisms, and other elements and logic described above, for example.

In the depicted example, local area network (LAN) adapter 912 connects to SB/ICH 904. Audio adapter 916, keyboard and mouse adapter 920, modem 922, read only memory (ROM) 924, hard disk drive (HDD) 926, CD-ROM drive 930, universal serial bus (USB) ports and other communication ports 932, and PCI/PCIe devices 934 connect to SB/ICH 904 through bus 938 and bus 940. PCI/PCIe devices may include, for example, Ethernet adapters, add-in cards, and PC cards for notebook computers. PCI uses a card bus controller, while PCIe does not. ROM 924 may be, for example, a flash basic input/output system (BIOS).

HDD 926 and CD-ROM drive 930 connect to SB/ICH 904 through bus 940. HDD 926 and CD-ROM drive 930 may use, for example, an integrated drive electronics (IDE) or serial advanced technology attachment (SATA) interface. Super I/O (SIO) device 936 may be connected to SB/ICH 904.

An operating system runs on processing unit 906. The operating system coordinates and provides control of various components within the data processing system 900 in FIG. 9. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 900 (Java is a trademark of Sun Microsystems, Inc. in the United States, other countries, or both).

As a server, data processing system 900 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 900 may be a symmetric multiprocessor (SMP) system including a plurality of processors in processing unit 906. Alternatively, a single processor system may be employed.

Instructions for the operating system, the object-oriented programming system, and applications or programs are located on storage devices, such as HDD 926, and may be loaded into main memory 908 for execution by processing unit 906. The processes for illustrative embodiments of the present invention may be performed by processing unit 906 using computer usable program code, which may be located in a memory such as, for example, main memory 908, ROM 924, or in one or more peripheral devices 926 and 930, for example.

A bus system, such as bus 938 or bus 940 as shown in FIG. 9, may be comprised of one or more buses. Of course, the bus system may be implemented using any type of communication fabric or architecture that provides for a transfer of data between different components or devices attached to the fabric or architecture. A communication unit, such as modem 922 or network adapter 912 of FIG. 9, may include one or more devices used to transmit and receive data. A memory may be, for example, main memory 908, ROM 924, or a cache such as found in NB/MCH 902 in FIG. 9.

Those of ordinary skill in the art will appreciate that the hardware in FIG. 9 may vary depending on the implementation. Other internal hardware or peripheral devices, such as flash memory, equivalent non-volatile memory, or optical disk drives and the like, may be used in addition to or in place of the hardware depicted in FIG. 9. Also, the processes of the illustrative embodiments may be applied to a multiprocessor data processing system, other than the SMP system mentioned previously, without departing from the spirit and scope of the present invention.

Moreover, the data processing system 900 may take the form of any of a number of different data processing systems including client computing devices, server computing devices, a tablet computer, laptop computer, telephone or other communication device, a personal digital assistant (PDA), or the like. In some illustrative examples, data processing system 900 may be a portable computing device which is configured with flash memory to provide non-volatile memory for storing operating system files and/or user-generated data, for example. Essentially, data processing system 900 may be any known or later developed data processing system without architectural limitation.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a processor, for performing a scattered load operation, comprising:
   receiving, in a cache memory of the processor, an extended address having a base address portion and a plurality of data element address portions that specifies a plurality of data elements to be accessed using the extended address;
   providing each of the plurality of data element address portions to corresponding data element selector logic units of the cache memory;
   selecting, by each data element selector logic unit in the cache memory, a corresponding data element from a cache line buffer based on a corresponding data element address portion provided to the corresponding data element selector logic unit; and
   outputting, by each data element selector logic unit, the corresponding data element.

2. The method of claim 1, wherein the extended address is received by a load/store unit of the processor, prior to being received in the cache memory, as part of a load instruction for loading a plurality of non-contiguous data elements from a same cache line of the cache memory.

3. The method of claim 2, wherein the load instruction is received in the load/store unit from a load generating unit in response to the load generating unit receiving a gather instruction.

4. The method of claim 2, wherein the data element selector logic units are multiplexers coupled to the cache line buffer and a corresponding vector slot of a vector register, and wherein the corresponding data elements are output to corresponding vector slots of the vector register.

5. The method of claim 3, further comprising returning the data elements to the load generating unit, wherein the load generating unit writes the data elements from a data line to corresponding vector slots of a target vector register specified in the gather instruction.

6. The method of claim 1, wherein the data element selector logic units are multiplexers coupled to the cache line buffer and a corresponding vector slot of a vector register, and wherein the corresponding data elements are output to the corresponding vector slots of the vector register.

7. The method of claim 1, wherein the base address portion of the extended address specifies a cache address tag and a cache line address that is common to all of the plurality of data elements specified in the plurality of data element address portions of the extended address.

8. The method of claim 3, wherein:
   the gather instruction specifies an offset address vector register having a plurality of offset addresses for a plurality of data elements to be loaded as part of the scattered load operation,
   the load generating unit determines if two or more of the plurality of offset addresses specify data elements within a same cache line, and
   the load generating unit generates the load instruction with the extended address in response to a determination that two or more of the plurality of offset addresses specify data elements within a same cache line.

9. An apparatus, comprising:
   a cache memory array;
   a cache line buffer coupled to the cache memory array; and
   a plurality of data element selector logic units coupled to the cache line buffer, wherein the apparatus is configured to:
   receive an extended address, the extended address having a base address portion and a plurality of data element address portions that specifies a plurality of data elements to be accessed using the extended address;
   provide each of the plurality of data element address portions to a corresponding data element selector logic unit in the plurality of data element selector logic units;
   select, by each data element selector logic unit, a corresponding data element from the cache line buffer based on a corresponding data element address portion provided to the corresponding data element selector logic unit; and
   output, by each data element selector logic unit, the corresponding data element.

10. The apparatus of claim 9, wherein the apparatus further comprises a load/store unit coupled to the cache memory array, and wherein the apparatus is further configured to receive the extended address in the load/store unit, prior to being received in the cache memory, as part of a load instruction for loading a plurality of non-contiguous data elements from a same cache line of the cache memory array.

11. The apparatus of claim 10, wherein the apparatus further comprises a load generating unit coupled to the load/ store unit, and wherein the apparatus is further configured to receive the load instruction in the load/store unit from the load generating unit in response to the load generating unit receiving a gather instruction.

12. The apparatus of claim 10, wherein the data element selector logic units are multiplexers coupled to the cache line buffer and a corresponding vector slot of a vector register of the apparatus, and wherein the corresponding data elements are output to corresponding vector slots of the vector register.

13. The apparatus of claim 12, wherein the apparatus is further configured to return the data elements to the load generating unit, and wherein the load generating unit is configured to write the data elements from the data line to corresponding vector slots of a target vector register specified in the gather instruction.

14. The apparatus of claim 9, wherein the data element selector logic units are multiplexers coupled to the cache line buffer and a corresponding vector slot of a vector register of the apparatus, and wherein the corresponding data elements are output to the corresponding vector slots of the vector register.

15. The apparatus of claim 9, wherein the base address portion of the extended address specifies a cache address tag and a cache line address that is common to all of the plurality of data elements specified in the plurality of data element address portions of the extended address.

16. The apparatus of claim 11, wherein:
the gather instruction specifies an offset address vector register having a plurality of offset addresses for a plurality of data elements to be loaded as part of the scattered load operation,
the load generating unit is configured to determine if two or more of the plurality of offset addresses specify data elements within a same cache line, and
the load generating unit is configured to generate the load instruction with the extended address in response to a determination that two or more of the plurality of offset addresses specify data elements within a same cache line.

17. A processor, comprising:
a cache memory unit comprising a plurality of data element selector logic units and a cache line buffer; and
a load/store unit coupled to the cache memory unit, wherein the processor is configured to:
receive an extended address in the cache memory unit, the extended address having a base address portion and a plurality of data element address portions that specifies a plurality of data elements to be accessed using the extended address;
provide each of the plurality of data element address portions to a corresponding data element selector logic unit in the plurality of data element selector logic units of the cache memory unit;

select, by each data element selector logic unit, a corresponding data element from the cache line buffer of the cache memory unit based on a corresponding data element address portion provided to the corresponding data element selector logic unit; and
output, by each data element selector logic unit, the corresponding data element.

18. The processor of claim 17, wherein the processor is configured to receive the extended address in the load/store unit, prior to the extended address being received in the cache memory unit, as part of a load instruction for loading a plurality of non-contiguous data elements from a same cache line of the cache memory array.

19. The processor of claim 18, wherein the processor further comprises a gather unit coupled to the load/store unit, and wherein processor is configured to receive the load instruction in the load/store unit from the gather unit in response to the gather unit receiving a gather instruction.

20. The processor of claim 18, wherein the data element selector logic units are multiplexers coupled to the cache line buffer and a corresponding vector slot of a vector register of the processor, and wherein the corresponding data elements are output to corresponding vector slots of the vector register.

21. The processor of claim 20, wherein the processor is configured to return the data elements to the load generating unit, and wherein the load generating unit is configured to write the data elements from a data line to corresponding vector slots of a target vector register specified in the gather instruction.

22. The processor of claim 17, wherein the data element selector logic units are multiplexers coupled to the cache line buffer and a corresponding vector slot of a vector register of the apparatus, and wherein the corresponding data elements are output to the corresponding vector slots of the vector register.

23. The processor of claim 17, wherein the base address portion of the extended address specifies a cache address tag and a cache line address that is common to all of the plurality of data elements specified in the plurality of data element address portions of the extended address.

24. The processor of claim 19, wherein:
the gather instruction specifies an offset address vector register having a plurality of offset addresses for a plurality of data elements to be loaded as part of the scattered load operation,
the load generating unit is configured to determine if two or more of the plurality of offset addresses specify data elements within a same cache line, and
the load generating unit is configured to generate the load instruction with the extended address in response to a determination that two or more of the plurality of offset addresses specify data elements within a same cache line.

* * * * *